United States Patent [19]

Seim et al.

[11] 3,928,126

[45] Dec. 23, 1975

[54] FUEL OR IRRADIATION SUBASSEMBLY

[75] Inventors: Orville S. Seim, Wheaton; Ernest Hutter, Wilmette, both of Ill.

[73] Assignee: The United States of America as represented by the United States Energy Research and Development Administration, Washington, D.C.

[22] Filed: July 9, 1974

[21] Appl. No.: 486,787

[52] U.S. Cl. .................................. 176/15; 176/78
[51] Int. Cl.² ............................................ G21C 3/02
[58] Field of Search ............................... 176/15, 78

[56] References Cited
UNITED STATES PATENTS 3,767,525  10/1973  Seim et al. .......................... 176/78
3,775,249  11/1973  Clapham .............................. 176/78
3,857,755  12/1974  Kinzer et al. ......................... 176/78

*Primary Examiner*—Harvey E. Behrend
*Attorney, Agent, or Firm*—Dean E. Carlson; Arthur A. Churm; Frank H. Jackson

[57] ABSTRACT

A subassembly for use in a nuclear reactor incorporates a loose bundle of fuel or irradiation pins enclosed within an inner tube which in turn is enclosed within an outer coolant tube and includes a locking comb consisting of a head extending through one side of the inner sleeve and a plurality of teeth which extend through the other side of the inner sleeve while engaging annular undercut portions in the bottom portion of the fuel or irradiation pins to prevent movement of the pins.

10 Claims, 5 Drawing Figures

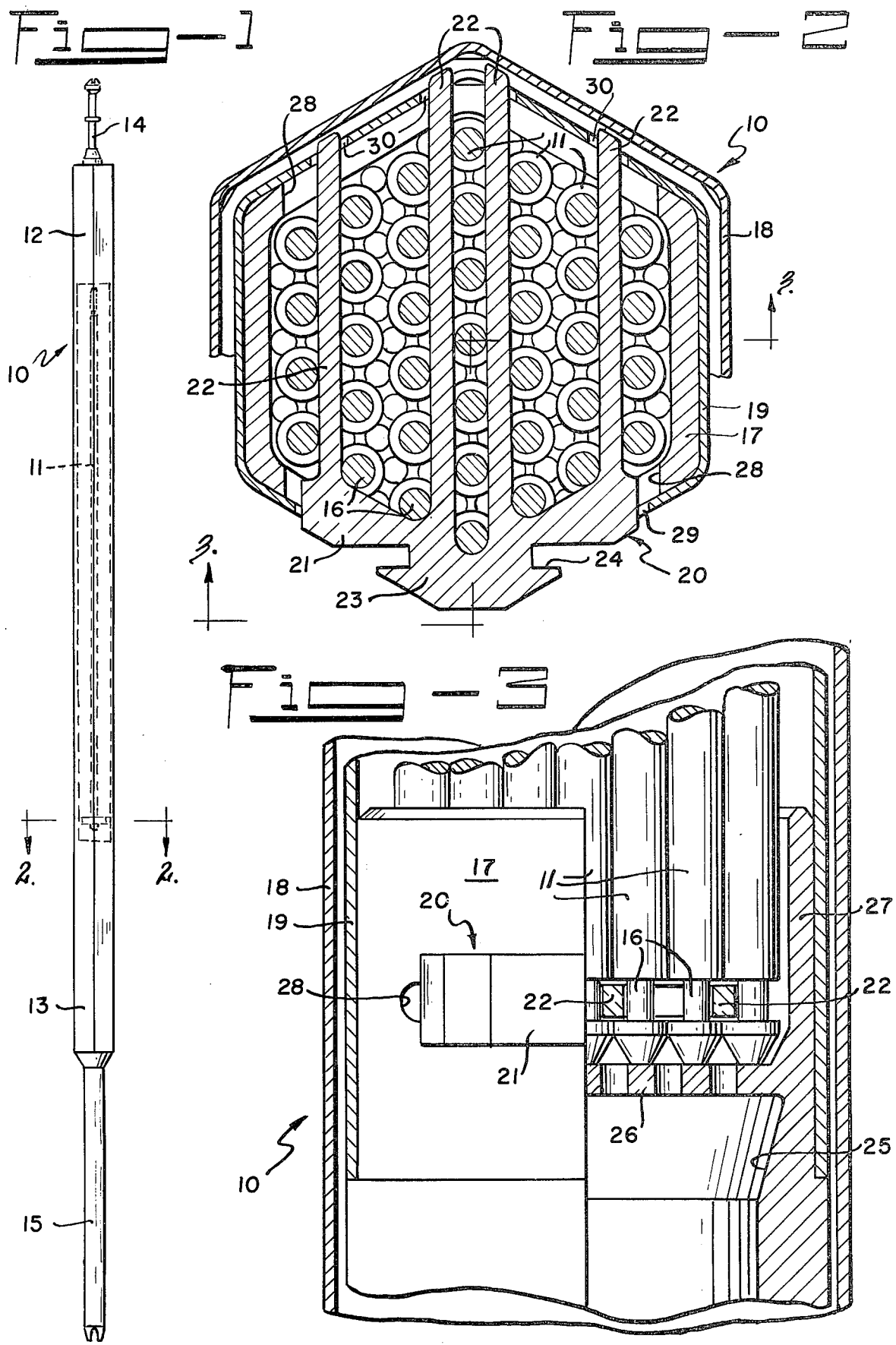

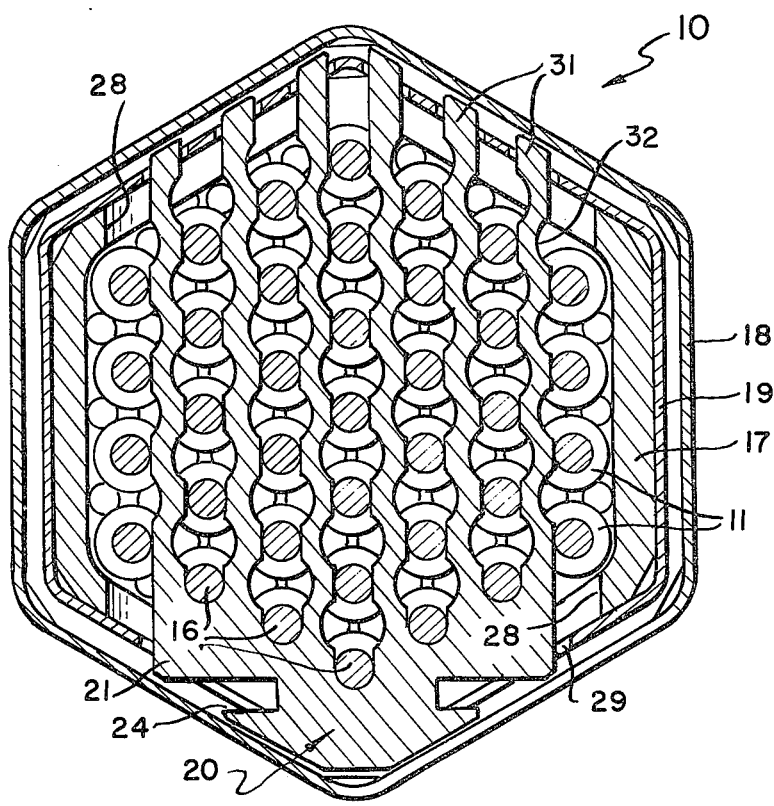
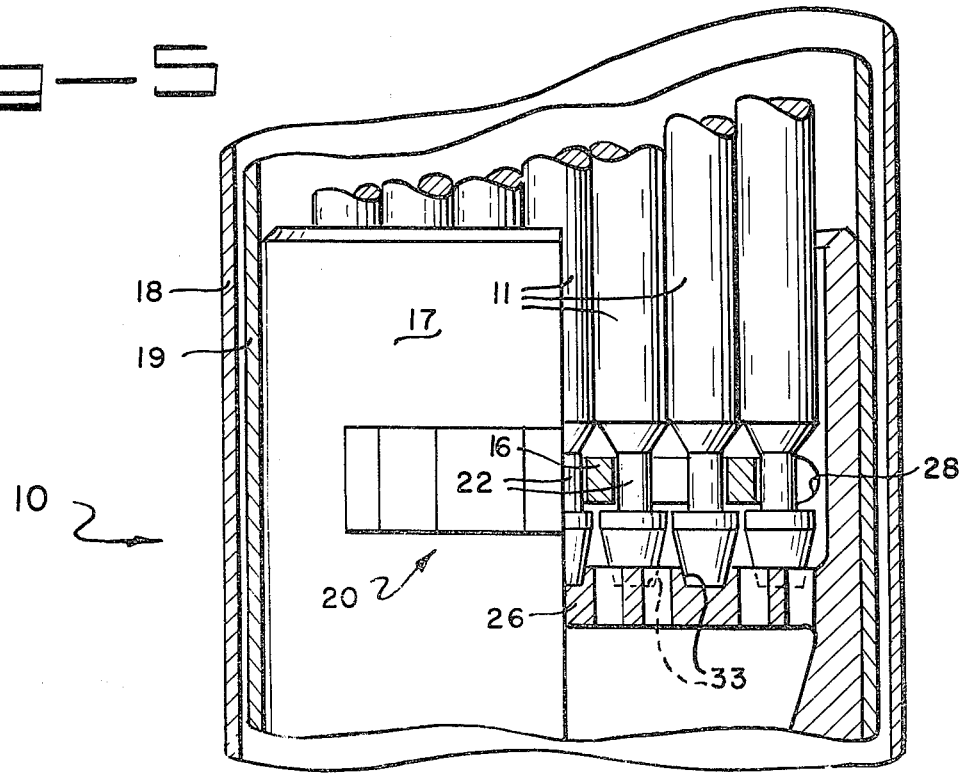

FUEL OR IRRADIATION SUBASSEMBLY

CONTRACTUAL ORIGIN OF THE INVENTION

The invention described herein was made in the course of, or under, a contract with the United States Atomic Energy Commission.

BACKGROUND OF THE INVENTION

This invention relates to a subassembly for use in a nuclear reactor incorporating removable pins and means for restraining the pins from movement. In more detail, the invention relates to a fuel subassembly for use in a nuclear reactor incorporating removable fuel pins and a locking comb for restraining the fuel pins from movement. The invention also relates to an irradiation subassembly for use in a nuclear reactor incorporating removable irradiation capsules and a locking comb for restraining the irradiation capsules from movement.

In general, nuclear fuel subassemblies and nuclear irradiation subassemblies are constructed so that the fuel or experimental pins are fixed in place therein so that the subassembly must be destroyed to remove the pins therefrom. It is thus not possible to remove one or more pins from a subassembly and replace them with different pins in the original subassembly. At present, failure of a single fuel or irradiation pin may necessitate removal of a subassembly from the reactor, disassembly of the subassembly and reinsertion of unfailed pins in a new subassembly while discarding the hardware of the original subassembly. With removable and replaceable fuel pins, one or more pins can be replaced without discarding the hardware of the subassembly. Replaceability of irradiation pins or capsules in an irradiation subassembly is even more important, since the subassembly can then be loaded with experiments requiring different irradiation exposures.

In all fuel and irradiation subassemblies, individual pins must be held rigidly in place while the assembly is positioned in a reactor. Conventionally, each of the pins is wound with a spiral spacer and the bundle of pins is held together tightly, ensuring the proper spacing. It is, of course, clearly impossible to remove one fuel pin from the subassembly without removing them all. It is also possible to space the elements loosely with a plurality of grids. If the elements are loose enough to remove individually — as may be desirable — it is necessary to employ locking means to prevent movement of the pins while the assembly is in position in a reactor. It is to a subassembly incorporating removable fuel or irradiation pins and means for preventing movement of these pins that this invention relates.

SUMMARY OF THE INVENTION

A subassembly for use in a nuclear reactor incorporates a loose bundle of fuel or irradiation pins enclosed within an inner tube which in turn is enclosed within an outer coolant tube and includes a locking comb consisting of a head extending through one side of the inner sleeve and a plurality of teeth which extend through the outer side of the inner sleeve while engaging annular undercut portions in the bottom portion of the fuel or irradiation pins to prevent movement of the pins.

BRIEF DESCRIPTION OF THE DRAWINGS

The invention will next be described in connection with the accompanying drawings wherein:

FIG. 1 is a vertical elevation of a subassembly containing nuclear fuel for use in a nuclear reactor, FIG. 2 is an enlarged horizontal section taken in the direction of the arrows in FIG. 1, FIG. 3 is a partial vertical section taken in the direction of the arrows 3—3 in FIG. 2, FIG. 4 is an enlarged horizontal section of an alternative embodiment, and FIG. 5 is a partial vertical section disclosing another alternative.

DESCRIPTION OF THE INVENTION

As shown in FIG. 1, subassembly 10 includes a plurality of pins 11 — which may be fuel pins or irradiation capsules — an upper radiation shield 12, a lower radiation shield 13, a top end fixture 14 and a lower adapter 15. Pins 11 have an annular undercut portion 16 (see FIG. 2) extending around the lower portion thereof for a purpose which will become apparent. More particularly (see also FIGS. 2 and 3), subassembly 10 consists of three partial assemblies: 1) a lower adapter assembly including lower adapter 15, lower radiation shield 13 and a coupling member 17, 2) outer hex tube assembly including top end fixture 14, upper radiation shield 12, and an outer hexagonal coolant tube 18, and 3) inner hex tube assembly including inner hexagonal tube 19 and pins 11. Coupling member 17 connects inner hex tube 19 to lower shield 13. Locking comb 20 is also employed, as will be described in more detail hereinafter. In the specific assembly described, there are 37 parallel pins 11 arranged in a hexagonal bundle in triangular array. Inner hex tube 19 encloses the bundle of pins 11 and is in turn enclosed by coolant tube 18.

Since the novelty present in the patent application resides primarily in locking comb 20 and coupling member 17, these elements will be described in detail, no further description of the remainder of the assembly being needed.

Locking comb 20 includes an angular head 21 and four rectangular, parallel teeth 22 extending outwardly therefrom. The two halves of head 20 join at an angle of 60° to conform to an angle of the coolant tube 18 and fit therewithin. Teeth 22 extend in a direction parallel to a line bisecting this angle. The two innermost teeth 22 are longer than the two outermost teeth and in position within the subassembly are disposed on opposite sides of the inner row of seven pins 11 engaging the undercut portions 16 therein. The two outermost teeth 22 in position within the subassembly are disposed between the two outer rows of pins 11 engaging the undercut portions 16 therein. For larger bundles of pins, additional teeth will be required disposed between alternate rows of pins. A handling element 23 is formed in head 21 by notches 24 which are perpendicular to teeth 22.

Hexagonal coupling member 17 includes a central bore 25 having a support grid 26 extending thereacross which serves as a stop for pins 11. Hexagonal inner tube 19 slides over a reduced portion 27 of the wall of coupling 17 to overlap the coupling member 17. Coupling member 17 has cut-away portions 28 on opposite sides thereof while inner hex tube 19 has a large slot 29 on one side thereof and three smaller slots 30 in the opposite side. One cut-away portion 28 in coupling member 17 and large slot 29 in inner hex tube 19 accept the head 21 of locking comb 20 and the other cut-away portion 28 in coupling member 17 and smaller slots 30 in the hex tube 19 accept the teeth 22 of locking comb 20, a single slot 30 accepting the two central teeth 22.

In assembly, the inner hex tube assembly is placed over the hex coupling member 17 of the lower adapter assembly with the slots in the hex coupling and inner hex tube aligned. The grid 26, by serving as a stop for the pins 11, serves to align the undercut portions 16 in the pins with the slots in the hex coupling and inner hex tube. When all the pins are seated, the locking comb 20 is inserted to lock the pins and inner hex tube to the lower adapter assembly. When the pins 11 are not properly located, the comb cannot be inserted beyond the hex coupling slot opening. All 37 pins are contacted by at least one tooth of the comb.

An alternative embodiment as shown in FIG. 4 is identical to the first embodiment except that it employs a full comb with a tooth 31 between every row of fuel pins. Thus, six teeth 31 are employed to provide locking support between each row of pins. Each tooth is relieved at noncontact points 32 to increase the flow area available.

A second alternate uses a four-toothed comb as in the first embodiment but, as shown in FIG. 5, has locating pockets 33 in the grid for the tips of each pin. The locating pockets restrain lateral movement of the elements while the comb prevents axial movement.

To disassemble the subassembly, the outer hex tube is removed by conventional removal methods. A handling tool fastened to the comb head is employed to withdraw the comb to release the inner hex tube and pins. If removal of an individual pin is required, the comb is only partially withdrawn, still holding the inner hex tube, but allowing removal of the uncoupled pins. If the inner hex tube is provided with inspection windows, reconstitution of the assembly is feasible.

The embodiments of the invention in which an exclusive property or privilege is claimed are defined as follows:

1. A subassembly for use in a nuclear reactor comprising a bundle of parallel pins incorporating nuclear fuel or a material to be irradiated enclosed within a coolant tube having an annular undercut portion in the lower portion of the coolant tube, an inner tube within said coolant tube and surrounding said bundle of pins, a coolant tube surrounding said inner tube, and a locking comb consisting of a head and a plurality of elongated teeth extending through slots in said inner tube and engaging said undercut portions of said pins to restrain the pins from movement.

2. A subassembly according to claim 1 and including a coupling member having a central bore and a support grid for the pins extending thereacross, said inner tube overlapping a reduced portion of said coupling member, the coupling member having slots therein aligned with the slots in the inner tube whereby the locking comb locks the inner tube, the coupling member and the pins into a fixed position.

3. A subassembly according to claim 2 wherein the pins are irradiation capsules and the irradiation capsules are disposed in triangular array in a hexagonal bundle and the coolant tube and inner tube are hexagonal in cross section.

4. An irradiation subassembly according to claim 3 wherein said locking comb includes an even number of teeth, the two central teeth being disposed on opposite sides of a central row of irradiation capsules engaging the undercut portions therein and in the irradiation capsules in the adjacent rows and additional pairs of teeth are disposed between alternate rows of pins whereby every pin is engaged by at least one locking comb tooth.

5. An irradiation assembly according to claim 4 and including locating pockets in the grid for the tips of the pins.

6. A subassembly according to claim 3 wherein said locking comb includes an even number of teeth disposed between all rows of irradiation capsules engaging the undercut portions thereof.

7. A subassembly according to claim 6 wherein the teeth are relieved at noncontact points to increase the available flow area.

8. An irradiation subassembly comprising a hexagonal bundle of elongated, parallel irradiation capsules disposed in triangular array within a hexagonal inner tube which in turn is disposed within a hexagaonal coolant tube, said coolant tube having an annular undercut portion in the lower portion thereof, a top end fixture at one end of the coolant tube and a lower adapter at the other end thereof, radiation shields in said coolant tube above and below said bundle of pins, a coupling member joining the inner hex tube to the lower radiation shield and overlapping the inner hex tube, said coupling member having a central bore with a support grid for the irradiation capsules extending thereacross, the inner hex tube having slots therein on opposite sides thereof and the coupling member having cutaway portions therein on opposite sides thereof, said slots and cut-away portions being aligned, and a locking comb consisting of a flat, angular head and an even number of teeth extending outwardly therefrom in a direction parallel to a line bisecting the angle, said locking comb being disposed in the irradiation assembly so that the head engages one of the openings in the inner hex tube and coupling member, the tips of the teeth engage the other openings and the teeth engage the undercut portion on at least one side of each irradiation capsule, the head being adapted to fit within one of the angles of the hexagonal coolant tube.

9. An irradiation assembly according to claim 8 wherein there are 37 irradiation capsules and four teeth on the locking comb, the innermost teeth engaging the undercut portions of the central row of irradiation capsules on both sides thereof and the outermost teeth being disposed between the two outermost rows of irradiation capsules and including locating pockets in the grid for the tips of the irradiation capsules.

10. An irradiation assembly according to claim 8 wherein there are 37 irradiation capsules and the locking comb has six teeth disposed between all rows of irradiation capsules, said teeth being relieved at non-contact points.

* * * * *